TACTILE COMMUNICATION SYSTEM
Filed Dec. 6, 1957 4 Sheets-Sheet 1
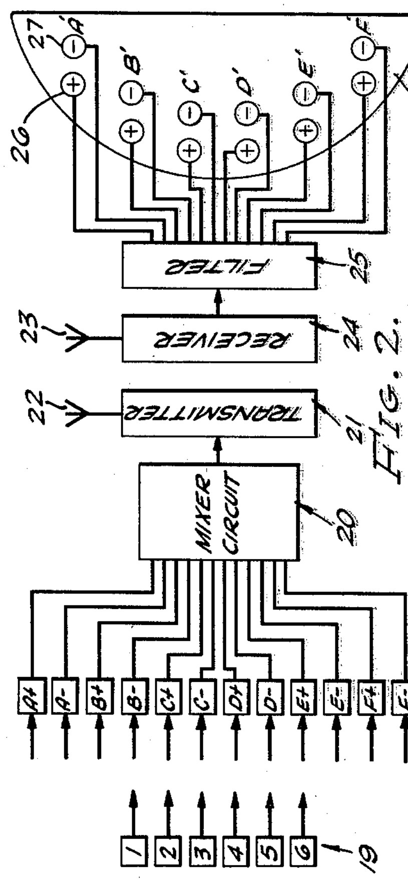
FIG. 2.
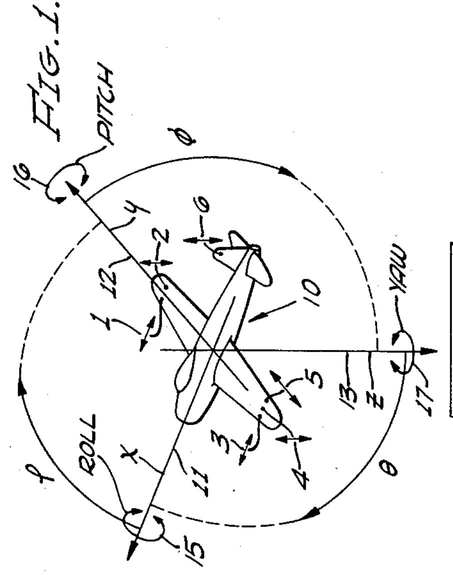
FIG. 1.
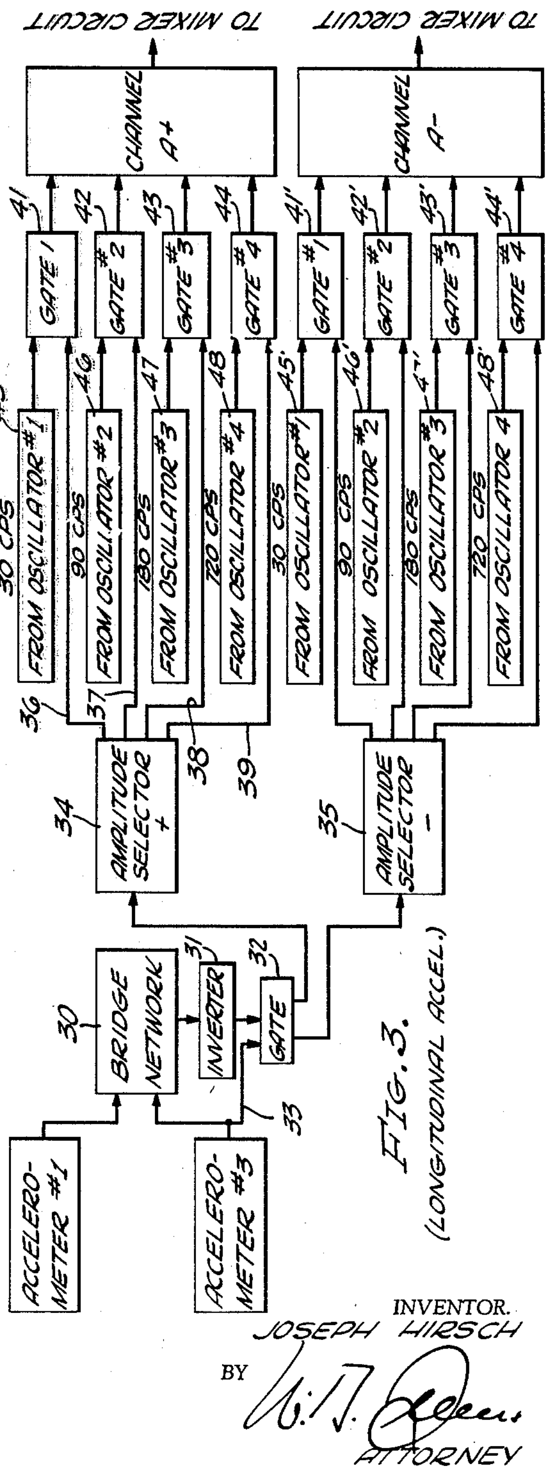
FIG. 3. (LONGITUDINAL ACCEL.)
INVENTOR.
JOSEPH HIRSCH
BY W. J. [signature]
ATTORNEY TACTILE COMMUNICATION SYSTEM
Filed Dec. 6, 1957 4 Sheets-Sheet 2
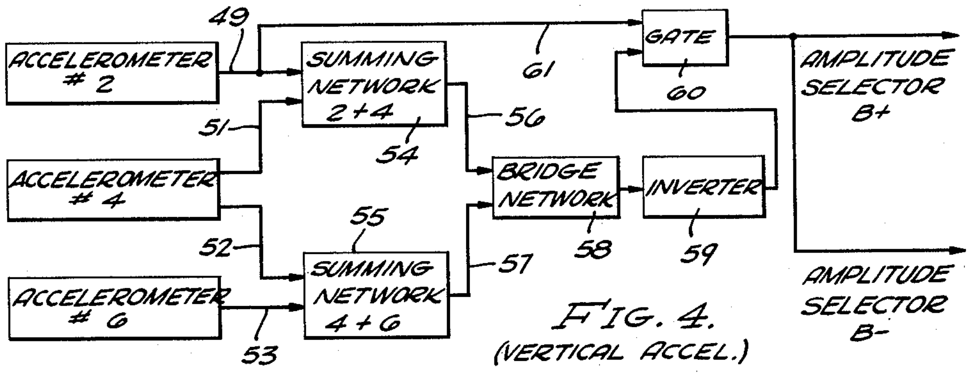
FIG. 4. (VERTICAL ACCEL.)
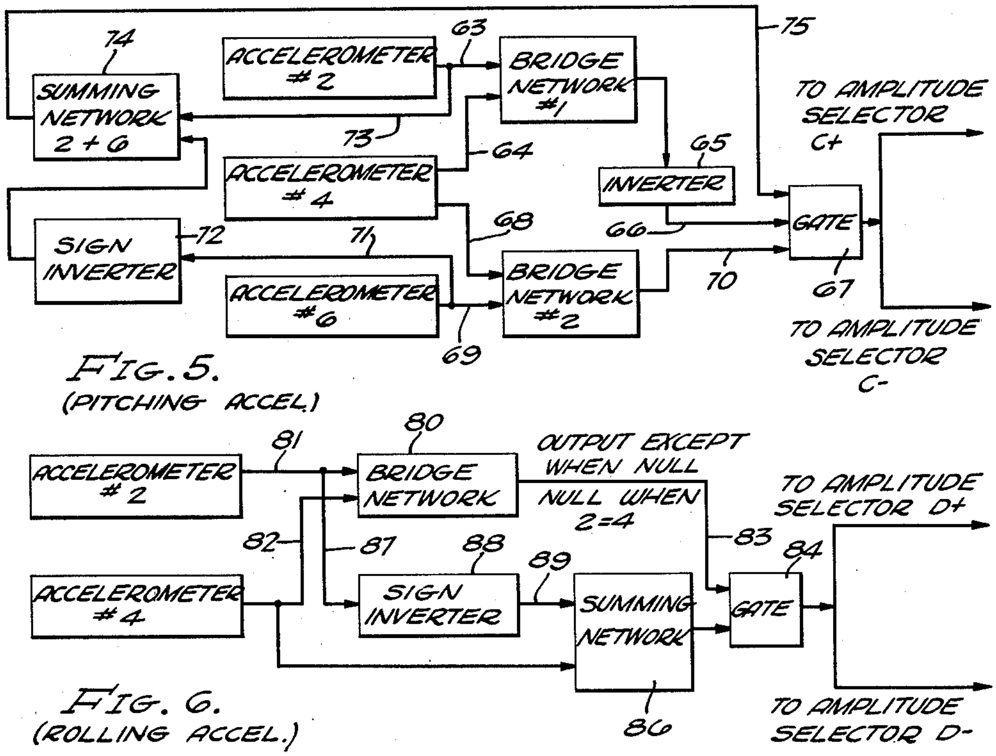
FIG. 5. (PITCHING ACCEL.) FIG. 6. (ROLLING ACCEL.)
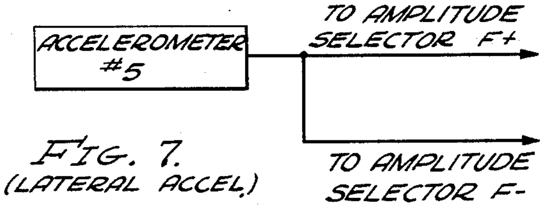
FIG. 7. (LATERAL ACCEL.)
INVENTOR.
JOSEPH HIRSCH
BY [signature]
ATTORNEY Nov. 17, 1964 J. HIRSCH 3,157,853

TACTILE COMMUNICATION SYSTEM

Filed Dec. 6, 1957 4 Sheets-Sheet 3

INVENTOR.
JOSEPH HIRSCH
BY [signature]
ATTORNEY

JOSEPH HIRSCH
INVENTOR.
BY [signature]
ATTORNEY

United States Patent Office 3,157,853
Patented Nov. 17, 1964

3,157,853

TACTILE COMMUNICATION SYSTEM

Joseph Hirsch, 1117 Fiske St., Pacific Palisades, Calif.

Filed Dec. 6, 1957, Ser. No. 701,087
7 Claims. (Cl. 340—27)

This invention relates to tactile communication systems and more particularly to means for and a method of operating an aircraft utilizing an improved tactile communication system adapted to communicate complex operation information over both short and long distances. By short distances, reference is had to communication within the craft itself whereas long distances include communication between the craft and some other separate object such as the ground, another craft, or a remote object.

The present application is a continuation-in-part of my application for United States Letters Patent, Serial No. 465,315, filed October 28, 1954, now abandoned, entitled Apparatus and Method for Communication through the Sense of Touch.

Although the distinct advantages of communicating information directly to the brain through tactile reception have been known and although prior attempts have been made to utilize the principles thereof in communicating information to the pilot and other crewmen of aircraft, the equipment heretofore provided for communicating tactually has been subject to so many shortcomings and so restricted in its range of capabilities as to offer no advantage over other available communication systems. It is known, for example, that vibratory stimuli tactually received is communicated to the brain automatically and without effort on the part of the subject. Unlike visually perceived information, there is no need for first adjusting the optic muscles to the nicety required in adjusting peripheral pressure on the lens system of the eye to focus on a specific target. Not only is an irreducible time period required for such adjustment of the eye, but the muscular and nervous energy consumed in the process is finite and leads to fatigue if continued over a period of time. Tactually perceived information, on the other hand, involves inconsequential effort on the part of the person, the information so perceived being impressed upon the brain automatically and significantly, with little or no interference with the simultaneous registry of other information received both visually and aurally. Accordingly, it will be appreciated that the communication of information tactually provides a complete channel to the brain independent of the ears and the eyes. The vast potentialities of this little used channel have gone unnoticed and are only now becoming evident.

Reference will now be had to specific applications for the tactile communication system of this invention. It is known that pilots of aircraft realize that much reliance in the flying of aircraft has been placed on the communication of certain characteristics of flight conditions to the pilot's brain via the "seat of his pants." This is because changes in flight conditions or in the attitude of the plane are instantly and instinctively sensed by the pilot by relative movement between his body and the plane seat. For example, changes in plane acceleration, the sudden shifting of the plane laterally, pitch, roll and other similar changes are sensed instinctively and automatically without need for visually checking instruments, viewing the horizon or other reference sources.

According to one mode of utilizing the communication system provided by this invention, tactually perceived significant intelligence can be communicated directly to the pilot or other crew member aboard the plane or, in the alternative, it can be communicated tactually to a remote human receiver stationed either on the ground or in another craft, such human receiver being provided with other means for communicating the essential portions only of the intelligence back to the originating craft or to other persons having need therefor. For example, the tactile communicating system may be coupled to numerous sources of information aboard the craft for the purpose of keeping the remote human operator fully apprised of miscellaneous operating conditions aboard the plane with the details of which it is unnecessary for the plane crew to be concerned.

The communication system of this invention will therefore be understood to permit the remote operator to concentrate on a certain phase of the operation to the exclusion of all other operating conditions and to the end that he may communicate to a particular member of the crew such information as is essential to the crew member. Such a communication system makes ti possible for a remote operator, such as a ground crewman, to be fully informed of all flight conditions essential for the blind landing of the craft and by voice or other communication directed back to the pilot to inform the pilot on information necessary for the blind landing of the plane.

It will also be understood that according to another mode of operation the communication system provided by the present invention can be connected directly to the pilot or one or more crewmen in a manner channeling desired operational information directly to the brain through tactile perception leaving the crewmen free to receive visual or aural information about other flight and operational conditions. In this simplified version of the system it is unnecessary to provide radio transmitters for communicating the information between the ship and a remote point as well as a return communication system to a crewman aboard the ship.

According to still another arrangement and application of the communicating system of this invention, the activating signal for the communicating system may be such as advises the human receiver by tactile perception of approaching danger such as the closing distance between the craft and another craft or between the craft and a feature of the terrain.

It will therefore be appreciated that the principles of this invention are very flexible and may be applied in a variety of ways to apprise a crewman or of someone acting in concert with the crewman of desired information automatically and without effort on his part by the use of vibratory stimuli and tactile perception.

In one specific application of the present system in the remote control of aircraft in flight, signal origin instruments properly disposed for sensing the six degrees of freedom of movement in flight, such as a six component balance, are utilized to activate the communication system. Thus, the position of a plane in free flight can be determined by a total of six measurements, three of which are linear and three of which are rotational. Thus, the three linear measurements occur in directions mutually perpendicular to one another and the three rotational measurements about these same three axes. If these six measurements are made by accelerometers appropriately positioned on the craft and are converted to signals clearly distinguishable from one another and capable of being separated after co-mingling, the resultant signals can be used to energize separate vibrators distinctively and in a manner conveying intelligence by tactile perception. In this manner there is provided means for conveying to a remote operator removed by many miles from the aircraft complete information of its changes in attitude and in all rectilinear movements. Utilizing this information, the ground observer is enabled to transmit by separate communication means information to the aircraft as necessary for the guidance of the craft through a desired course. In many instances in the blind landing of a high speed aircraft, it is desirable for the ground control operator to have some indication of the aircraft's accelerations so that necessary corrections can be effected quickly.

Under certain conditions, the information provided by the six component balance or other sensing instruments may be transmitted directly to individual vibrators in contact with the body of a crewman on board the craft. Such crewman may be the pilot in actual control of the craft or a separate crewman, such as an engineering officer, who can relay directions to the pilot to the extent necessary to maintain the plane at a desired attitude or on a prescribed course.

Also, on take-off a pilot may have need for focusing alternately on a nearby object, such as an instrument panel, and a distant object such as the runway or horizon. If, under these conditions, he is called upon to take some action based on information from such near and distance sightings, his reaction time will be increased by the time required for the accommodation and convergence as he changes focus to view the near and distant objects. This critical time loss can be avoided if the essential information for the action can be supplied tactually to the pilot without need for first making visual sightings of any kind thereby leaving the eyes free for other purposes.

Also, emergency situations arise and it is important that the pilot be made instantly aware of such situations without the delay unavoidably entailed in such operations as the focusing of the eyes. For example, the attitude of the airplane might be approaching stall conditions and such information should instantly be provided the pilot.

According to still another mode of utilizing the tactile communication system of this invention, the activating signals can be picked up by radar equipment or other sensing instrumentation effective in measuring the distance between the aircraft and other aircraft in the vicinity or an obstruction in the path of flight, the received signal being utilized to apprise the receiving crewman by tactile perception of the changing distance and the direction of change between the aircraft and the other object.

Accordingly, it is a primary object of the invention to provide means for instantaneously sensing and communicating to an operator's brain by vibratory stimuli and tactile perception information useful in the operation of aircraft and the like.

Another object of the invention is the provision of an improved means for communicating information from one or more sensing instruments and impressing tactually intelligence from that instrument directly on the brain of a receiving operator automatically and without need for any conscious action or effort on his part.

Another object of the invention is the provision of means for conveying to the pilot of an aircraft tactually and instantly information concerning the altitude of the craft.

Another object of the invention is the provision of instrumentation for aircraft functioning automatically to convey desired operation information to members of the crew by tactile communication means.

Another object of the invention is the provision of instrumentation for aircraft by which the angles of rotational movements and of certain other operational factors can be measured and automatically channeled to a human occupant of the craft via readily understood tactually perceptible stimuli.

Another object of the invention is the provision of a system and means for communicating changing operational flight conditions of an aircraft directly to the brain of a receiving operator through tactile perception.

Another object of the invention is the provision of a blind landing system for controlling the flight of aircraft by operational flight information originating in the aircraft and transmitted to a remotely located operator through signals transmitted from the aircraft to the remote operator.

Another object of the invention is the provision of a communication system adapted for activation by a six component balance sensing mechanism and adapted to transmit intelligence simultaneously from the individual sensing instruments to a remotely located receiving operator and utilizing vibratory stimuli activated by the distinctly different signals originating from the individual sensing instruments, which vibratory stimuli are tactually perceptible and intelligible to the receiving operator.

Another object of the invention is the provision of a communication system for detecting the changing distance and direction of change between the vehicle under way and an object in its course together with means for communicating the information tactually to a crewman aboard the vehicle.

These and other more specific objects will appear upon reading the following specification and claims and upon considering in connection therewith the attached drawings to which they relate.

Referring now to the drawings in which preferred embodiments of the invention are illustrated:

FIGURE 1 is a graphical view of an aircraft having super-imposed thereon a graph showing three mutually perpendicular linear axes of movement and the three rotational directions of movement about these same axes together with the locations of the sensing devices of a six-component balance;

FIGURE 2 is a schematic view of a preferred communication system incorporating the present invention and suitable for communicating the readings from a six component balance to a remote receiver having separate vibrators adapted to be activated by signals from the individual sensing devices;

FIGURE 3 is a schematic of tank circuit components used in sensing longitudinal acceleration rearward of the mixer circuit;

FIGURE 4 is a schematic of tank circuit components used in sensing vertical acceleration rearward of the amplitude selectors;

FIGURE 5 is a schematic similar to FIGURE 4 of tank circuit components used in sensing pitching of the aircraft.

FIGURE 6 is a schematic similar to FIGURE 4 of tank circuit components used in sensing rolling of the aircraft;

FIGURE 7 is a view similar to FIGURE 6 showing the circuit used in sensing lateral acceleration;

Figure 8:
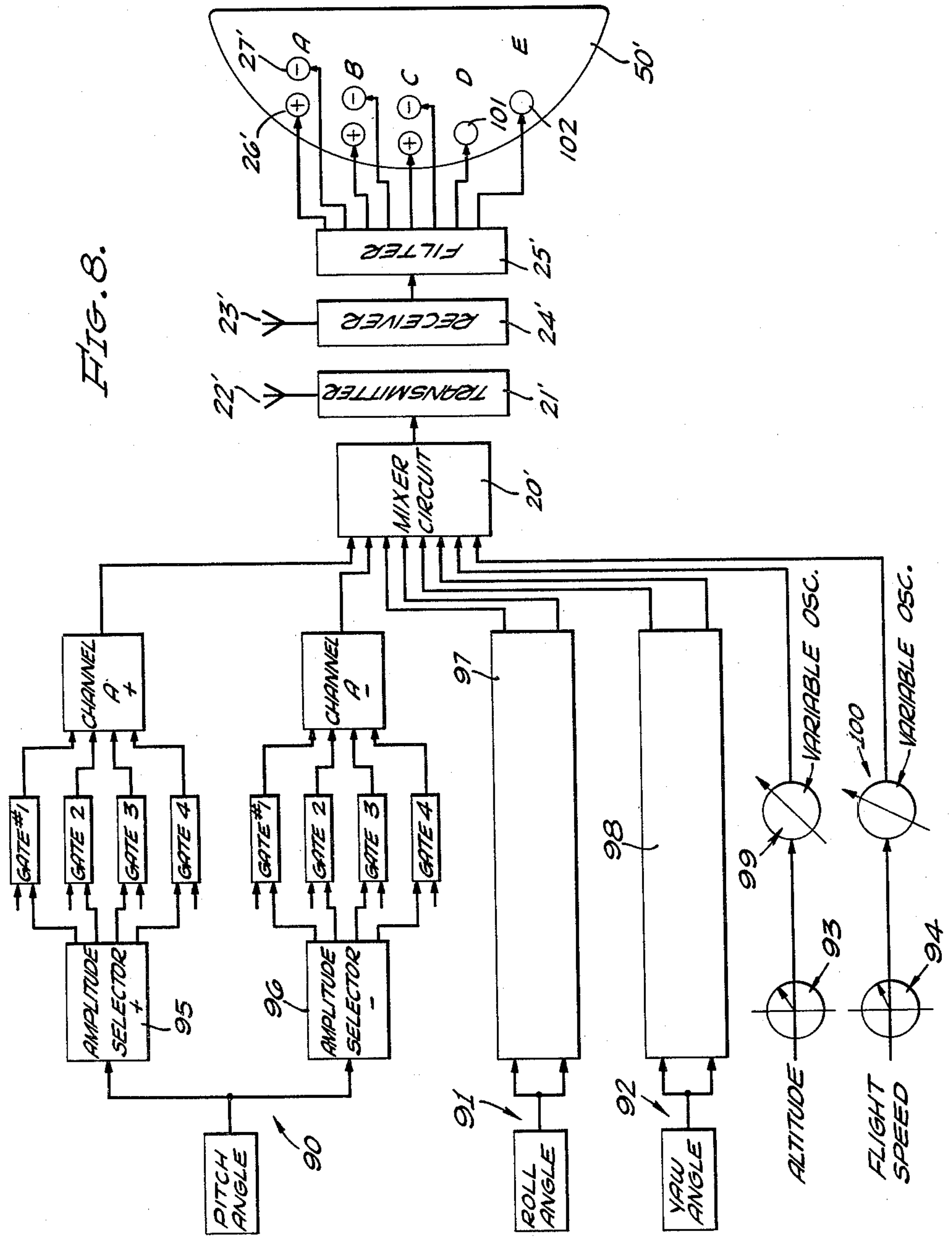
FIGURE 8 is a schematic view of another embodiment of the invention.

In one preferred embodiment of the invention illustrated generally in FIGURES 1 and 2, a conventional type six component balance is used to sense and communicate intelligence signals to a computer mechanism operable to convert the sensing signals into a form suitable for tactile perception. The six separate components of the balance are appropriately positioned in an aircraft designated generally 10 in FIGURE 1. The three mutually perpendicular axes include an axis X extending longitudinally through the center of the craft fuselage, a transverse axis Y at right angles thereto and extending transversely of the craft and longitudinally through the wings, and a vertical axis Z. Accelerations occurring parallel to any one of these axes are linear. The other three possible directions of acceleration are known as rotational accelerations and take place respectively arcuately about the axes of the described three linear axes 11, 12 and 13. For example, rotational acceleration of the craft about longitudinal axes 11 is indicated by the arcuate double-ended arrow 15 and represents the roll of the craft. The double-ended arcuate arrow encircling lateral 12 is designated 16 and represents pitching of the craft. The double-ended arcuate arrow 17 encircling vertical axis 13 represents yawing of the craft. Acceleration in any one of the six described directions can be either positive or negative.

According to one embodiment of this invention, acceleration changes in the particular accelerometer or set of accelerometers arranged to detect such changes in the three linear directions and in the three rotational directions are represented by direct current output signals, the magnitude and polarity of which are the variables fed to the computer. The six separate accelerometers of any well known type are preferably disposed in the outer ends of the wings and tail structure such as indicated, for example, by the dots in FIGURE 1 designated 1, 2, 3, 4, 5 and 6. The disposition of each accelerometer relative to the axes X, Y and Z are indicated by the double-ended arrows associated with each in FIGURE 1, it being understood that these are operable separately or in the groups specified below to sense acceleration values in the directions indicated:

| Accelerometer Numbers | Acceleration Sensed |
|---|---|
| 1 and 3 | Longitudinal. |
| 2, 4 and 6 | Vertical. |
| 5 | Lateral. |
| 2, 4 and 6 | Pitching. |
| 2 and 4 | Rolling. |
| 1 and 3 | Yawing. |

In the case of linear accelerations parallel to any one of the three axes, the acceleration at each sensing device is equal and either positive or negative. However, as will be appreciated upon reflection, rotational accelerations about any of the three axes are represented by a combination of positive and negative readings of the particular sensing devices utilized. For example, positive pitch is represented by equal positive readings of sensing devices 2 and/or 4 and a negative reading at sensing device 6, and negative pitch being represented by a reversal of the polarities of these same devices. For convenience, the various movements and the polarities of the readings of the accelerometers involved may be classified as follows:

| Acceleration Sensed | Accelerometer Involved and Polarity of Signal | |
|---|---|---|
| | Positive Values | Negative Values |
| Longitudinal | +1=+3 | −1=−3 |
| Vertical | +2=+4=+6 | −2=−4=−6 |
| Lateral | +5 | −5 |
| Pitching | +2=+4 and +2 or +4 −6 | −4=−2 and +6 −4 or −2 |
| Rolling | +4 −2 | +2 −4 |
| Yawing | +3 −1 | −3 +1 |

Referring now more particularly to FIGURE 2, the communication system designed to be activated by sensing devices or accelerometers 1 to 6 and designated generally 19 are each connected through suitable computer components and frequency selector circuits omitted from FIGURE 2 but shown in FIGURES 3 to 7, inclusive, so designed and arranged as to feed a distinctive signal through separate channels marked A plus, A minus to F plus *f* minus in FIGURE 2 and leading into a mixer circuit 20. There the various distinctive signals are combined into a single complex signal which is transmitted into space through the transmitter 21 and antenna 22 carried by the aircraft. This complex signal is received by a remote antenna 23 and a receiver 24 from which it passes into a filter 25 for unscrambling the complex signal into its individual components each of which is channeled to a particular one of the vibrator diaphragms of a type suitable for tactile perception by the human receiver. Each individual pair of vibratory diaphragms, such as diaphragms 26 and 27 for receiving plus and negative readings originating from accelerometer 1, is of a type suitable for support in contact with the skin of the human receiver.

It is pointed out that the signals emanating from the sensing devices vary in polarity and in magnitude thereby to represent the direction and magnitude of the change sensed. The computer components are effective to analyze these signals and to convert them into distinctive signals each at a different frequency spaced from one another and lying within a range readily sensed and identified by tactile perception. Experience has demonstrated that frequencies between 30 and 800 c.p.s. are suitable. A greater separation of the frequencies is required for signals in the upper portion of this range than in the lower, a difference of only a few cycles being easily detected tactually in low frequency signals but a separation of 100 c.p.s. or more being desirable at the upper extremities of the range. Of course, experience enables the subject receiver to distinguish between closely related signals much more readily.

It is pointed out that such accelerometer 1 to 6 is energized from a direct current source so arranged that when moving at a uniform rate with no acceleration, the output signal is zero. However, should there be an acceleration in the linear or rotational directions to which the accelerometer is sensitive, then the amplitude together with the polarity of the output signal is indicative of and is proportional to the acceleration value, a positive polarity indicating an acceleration in one direction and a negative polarity indicating an acceleration in the opposite direction. It will further be understood that each of the six accelerometers is of a type which is effective to sense change of direction only along a given straight or arcuate path. It will be recognized that a comparison of the readings from the six sensing instruments will enable a skilled technician to be apprised of changes in the attitude of the craft. In consequence, the present invention provides a remote receiving operator with a seat on the aircraft just as effectively as though he were actually present on the craft and sensing the acceleration changes similarly to those actually present on the craft. Additionally, the remote operator has the decided advantage that the delicate sensing instruments provide a far more detailed source of information than is available to those on the plane and relying upon gravity acceleration and their several senses to learn of changes in the attitude of the plane.

Referring to FIGURE 3 showing the computer components for analyzing longitudinal acceleration signals as determined by the two signals received from accelerometers 1 and 3, it is pointed out that these signals are fed into the analyzing bridge network 30 for comparison. If the signals are of the same polarity and approximately equal, no signal passes to a biased amplifier 31 here used as an inverter. Inverter 31 is rendered functional in the absence of an input signal from the network 30 and emits a signal to the double triode gate 32 opening the latter and allowing the signal from one of the accelerators such as 3 to pass through channel 33 to the gate and on to one of the amplitude selectors 34, 35 depending upon the polarity of the signal received from the sensing device. Thus, if the received signal is positive, it is channeled through gate 32 to selector 34 and from there into an appropriate one of the channels 36 to 39 depending upon the magnitude of the received signal, a minimum value signal being channeled through 36 and a larger value signal to an appropriate one of the other channels. The signal so channeled goes to one of the double triode gates 41 to 44 where it is operative to open that gate and allow a particular and distinctive frequency from one of the continuously operating oscillators 45 to 48 to pass through the gate to mixer circuit 20. There the signal is mixed with other signals arriving from other of the computer circuits as well as described presently for transmission through transmitter 21 and antenna 22 to receiving antenna 23.

If the signal received from accelerators 1 and 3 is of a negative polarity, gate 32 functions to channel the signal to amplitude selector 35 from which it passes to an appropriate one of the gates 41' to 44' corresponding with gates 41 to 44 and each operating when activated to open and allow a particular preselected frequency signal to pass from an associated one of oscillators 45' to 48' to the mixer circuit.

It is pointed out that the corresponding oscillators of the two groups are identical, oscillator 1 of each group generating a frequency of 30 c.p.s., oscillator 2 a frequency of 90 c.p.s., oscillator 3 a frequency of 180 c.p.s., and oscillator 4 a frequency of 720 c.p.s. It will also be understood that the described separation permits the signals to be readily separated by filter 25 at the receiving station so that the signals received from channels A plus and A minus are routed to vibrator 26 if it is positive and to vibrator 27 if it is negative.

Vibrators 26 and 27 may be of any suitable construction and adapted to be operatively associated with the finger of the operator's hand or some other appropriate part of his body. As here shown, the diaphragms are mounted in an arcuately shaped mounting 50 merely for convenience of illustration. In actual practice, diaphragms 26 and 27, for example, may be suitably arranged for attachment to spaced points of the little finger, for example, so that vibratory stimulus received from the diaphragm 26 at one end of that finger will immediately apprise the receiving operator that a positive longitudinal acceleration is occurring, whereas if the stimulus is received from diaphragm 27 at the other end of the little finger, the receiving operator knows instinctively that the aircraft is slowing down.

In like manner, each pair of diaphragms B' to F', inclusive, will be understood to be arranged for activation in a similar manner so that the operator knows when a signal of a particular frequency is received on the outer end of a particular finger that a positive acceleration of a particular type is occurring, whereas negative acceleration is represented if the stimuli is received at the inner end of the finger. The last pair of diaphragms F' are similar to the others and may be secured to the operator's wrist or to his other hand. In fact, if desired, the pairs of diaphragms represented by the letters A' to F' may be divided between the operator's hands.

Referring now to FIGURE 4, there is shown the computer components employed to analyze signals received from vertical sensing accelerometers 2, 4 and 6 known to be taking place only when the signal from all three accelerators is of the same polarity and approximately of the same value. Accordingly, the signal from sensing devices 2 and 4 passes to summing network 54 through channels 49 and 51. At the same time, signals from devices 4 and 6 pass through channels 52, 53 to summing network 55. The outputs from these networks are fed into bridge 58 through channels 56 and 57 where the two outputs are compared. If these signals are equal, then there is no output from the bridge and inverter 59 which, like inverter 31, emits a signal only in the absence of an input, transmits a signal to the double triode gate 60 opening the latter and allowing one of the equal signals, as from sensing device 2, to pass through channel 61 and through the gate to either a positive or a negative amplitude selector depending upon the polarity of the received signal. The amplitude selectors will be understood to be similar to selectors 34 and 35 described above and to be connected to gates and continuously operating frequency generators identical with the corresponding gates 41 to 44 and 41' to 44' and oscillators 45 and 48 and 45' to 48', respectively.

The computer components designed to analyze pitching acceleration signals are illustrated in FIGURE 5, it being noted that sensing devices 2, 4 and 6 are necessary for this purpose and it being recalled from the table and description set forth above that this sub-assembly of the computer circuit is designed to analyze two equal signals of one polarity and a signal from the third device of the opposite polarity. Let it be assumed that the signals received from devices 2 and 4 are equal and positive. These flow through channels 63, 64 to bridge network #1. If they are found equal and of the same polarity, the output signal from the bridge is zero in which event inverter 65 emits a signal through channel 66 as one of the two signals required to activate a triple triode gate 67, it being understood that this gate opens only when appropriately energized by a second activating signal received simultaneously. Referring now to sensing devices 4 and 6 and bearing in mind that the signal from 4 is positive, it follows that if the pitching acceleration is also positive, then the signal issuing from sensing device 6 should be negative. These two signals of different polarity are sent to bridge network #2 through channels 68, 69 and the resultant signal passes through channel 70 to gate 67. This resultant signal taken with that received through channel 66 is effective to open gate 67 allowing the signal emanating from sensing devices 2 and 6 to pass to the amplitude selector. This latter signal is received in part from device 6 through channel 71 which passes through a sign inverter 72 in order that this negative signal can be converted to a positive signal for addition to the positive signal received from device 2 through channel 73. Accordingly, the described signals passing through channels 71, 73 are fed into summing network 74 and the resultant output passes through channel 75 and through the open gate 67 directly to amplitude selector C plus. If negative pitch is taking place, the described computer circuit operates in the same manner but the resultant negative signal flowing in lead 75 is channeled by gate 67 to amplitude selector C minus.

Referring now to FIGURE 6, there is shown the computer network for determining rolling acceleration. Since rotational accelerations are involved, the computer is designed to analyze positive and negative signals emanating from the sensing devices, these being devices 2 and 4 so disposed as to sence roll acceleration. If the roll is positive, then the signal from sensing device 2 will be negative and that from sensing device 4 will be positive. These different polarity signals are conveyed into the bridge network 80 through channels 81 and 82 respectively. Network 80 is so designed that it has an output except when null, and the output is null when the signal from 2 equals the signal from 4. The absence of a signal in channel 83 permits double triode gate 84 to open so that a signal from one of the sensing devices can pass therethrough to one of the amplitude selectors D plus of D minus depending upon the polarity of the signal received. This latter signal is here shown as emanating from sensing device 4 through channel 85 where it is fed into a summing network 86. A negative signal from sensing device 2 passes through channel 87 to a sign inverter 88, then through channel 89 into the summing network. The signals from the two sensing devices being of opposite polarity, it is desirable to change the sign of one by sign inverter 88 so that they may be summed in network 86 for passage through gate 84 to amplitude selector D plus. It will be understood that if negative acceleration is being measured the polarity of the signals from the devices will be opposite and that the gate is operable to channel the resulting signal to amplitude selector D minus.

Yaw acceleration is measured by an identical network to that described for roll acceleration with the exception that the signals are received from sensing devices 1 and 3. And, of course, the resulting signal passing through the gating device is channeled to amplitude selector E plus or E minus depending upon whether the yaw is positive or negative.

Lateral acceleration involves the use of but a single sensing device here shown as device 5. Since only one sensing device is required, a computer analyzing circuit is unnecessary and the output signal is channeled directly to amplitude selector F plus or F minus depending upon the polarity of the signal which is determinative of the direction of lateral acceleration.

In view of the very detailed explanation given of the entire circuit and particularly of the computer components, it is deemed unnecessary to summarize the overall operation. It will be understood that the signals directed to either the positive or negative amplitude selectors are effective to release an appropriate frequency signal into the mixer circuit 20 for co-mingling into a complex signal. This latter signal is received at the remote station and is there separated into its original constitutent components for channeling to a specific one of the positive or negative vibrator devices all of which are adapted to be connected to the body of the receiving operator. This operator is thereby enabled to be fully informed of changes in the attitude of the craft at all times.

This information so received by the operator can be supplemented advantageously by other information, as for example, that presented visually by radar, television or other means, and availed of to communicate directions by voice radio to a member of the plane crew in either summary or detail form as deemed desirable for the proper control of the plane under the particular flight conditions. It is pointed out and emphasized that the information communicated as described to the remote operator is so accurate and complete, and is transmitted so rapidly that the pilot and other crew members are enabled to complete complex flight patterns including the blind landing of the craft by instructions furnished from the ground operator on the basis of intelligence conveyed to him both visually and tactually by the described communication system.

Referring now to FIGURE 8, there is shown a modified embodiment of the communication system generally similar to that described above but designed to sense and communicate a different group of operating factors concerning a craft in flight. The sensing devices for the various factors or conditions are indicated along the left hand margin of the figure and include a pitch angle sensing and analyzing network 90, a roll angle sensing and analyzing network 91, a yaw angle sensing and analyzing network 92, an altitude sensing device 93 and a flight speed sensing device 94. The details as such of the sensing devices form no part of the present invention but will be understood to include means by which different angular positions of the craft are detected by appropriate instruments, each being provided with means for activating the sensing circuit with a different characteristic voltage signal for each unit of angular measurement. A positive signal indicates rotation in one direction and a negative signal rotation in the opposite direction. The tactual perception of such information, though useful at times, will be of particular importance to the pilot during take-off when preception through other sense organs are saturated and in emergency situations where faster response is of crucial importance.

Networks 90, 91 and 92 will be understood as transmitted to amplitude selectors operable in the manner described above to channel positive signals to a particular gate depending upon the value of the positive signal, and such signal there being effective to open the gate and allow the associated distinctive frequency signal to flow to the mixer circuit 20' through channel A plus. If, on the other hand, the pitch angle signal is negative, negative amplitude selector 96 is operative to activate one of the negative oscillator gates and allow a particular and distinctive signal to pass through channel A minus to mixer circuit 20' and transmitter 21'. The signal is transmitted to a remote receiver 24' where it passes through a filter 25' operating in the same manner as described above to separate a complex signal into its respective original components. Thus, the frequency components selected for use with network 90 are separated from the different frequency components characteristic of the signals from each of the other networks 91, 92, 93 and 94, the signals so separated being channeled to a particular vibratory stimulator such as 26' or 27' associated with network 90.

The roll angle sensing and analyzing network 91 will be understood to include the same type of components described above for analyzer 90 and the output thereof is transmitted to mixer circuit 20' to become part of the complex signal transmitted to the remote receiver. The same statements apply equally to the yaw angle sensing and analyzing network 92, it being pointed out that the circuits within rectangles 97 and 98 compare with those shown in greater detail immediately above for pitch angle analyzer 90. It is pointed out that the signals from the oscillators may be continuous or intermittent and that the spacing between intermittent signals may be lengthened or shortened as an aid in conveying and separating intelligence tactually. Such variation in the transmitted signals applies to all forms and to all of the sensing devices herein described.

The altitude and flight sensing devices 93 and 94, respectively, will be understood to have an output signal variable with altitude and flight speed, respectively, the output signal being utilized to operate selsyns or other type of servo-mechanism operable to adjust an associated variable frequency oscillator 99, 100 to provide an output signal to mixer circuit 20', the frequency of which increases proportionately to the increase in altitude or flight speed. If preferred, the oscillator outputs may vary in steps, each step consisting of a constant frequency representative of an appropriate increment of altitude or of flight speed. The output of the altitude sensing circuit 93 and of its associated oscillator is used to activate vibrator diaphragm 101 whereas the output of oscillator 100 is used to activate diaphragm 102, it being understood that each diaphragm is secured to a different area of the body and is operative to apprise the wearer of changing altitude and flight speed by vibratory stimuli of different frequencies tactually perceptible to the operator.

Although the above circuit has been described for communicating information between a craft in flight and a ground operator, it will be understood that the intelligence communicated may be confined to the craft itself. Likewise, the remote receiver may be located on another craft in flight. If the receiving operator is aboard the same craft then the output from the several oscillators may be connected directly to the vibratory stimulator diaphragms making it unnecessary to use mixer circuit 20', transmitter 21', receiver 24' and filtering circuit 25'. By means of this greatly simplified system, certain essential information needed by the pilot or by any other crew member may be communicated directly to the brain without need for effort or action on the part of the receiver and without interference with the use of his eyes or ears for the perception of information aurally or visually. Although the systems disclosed above have been described in connection with certain condition sensing devices, it will be apparent that the sensing devices may be designed to provide changing operational information about any condition whatsoever and irrespective of whether the conditions are related or unrelated. And, of course, the number of sensing devices which can be utilized in the manner described is not limited to the number here shown but may be increased or decreased as found desirable within the limits of the available frequencies which can be used to activate the vibratory stimulators in a manner interpretable by tactile perception.

Figure 9:
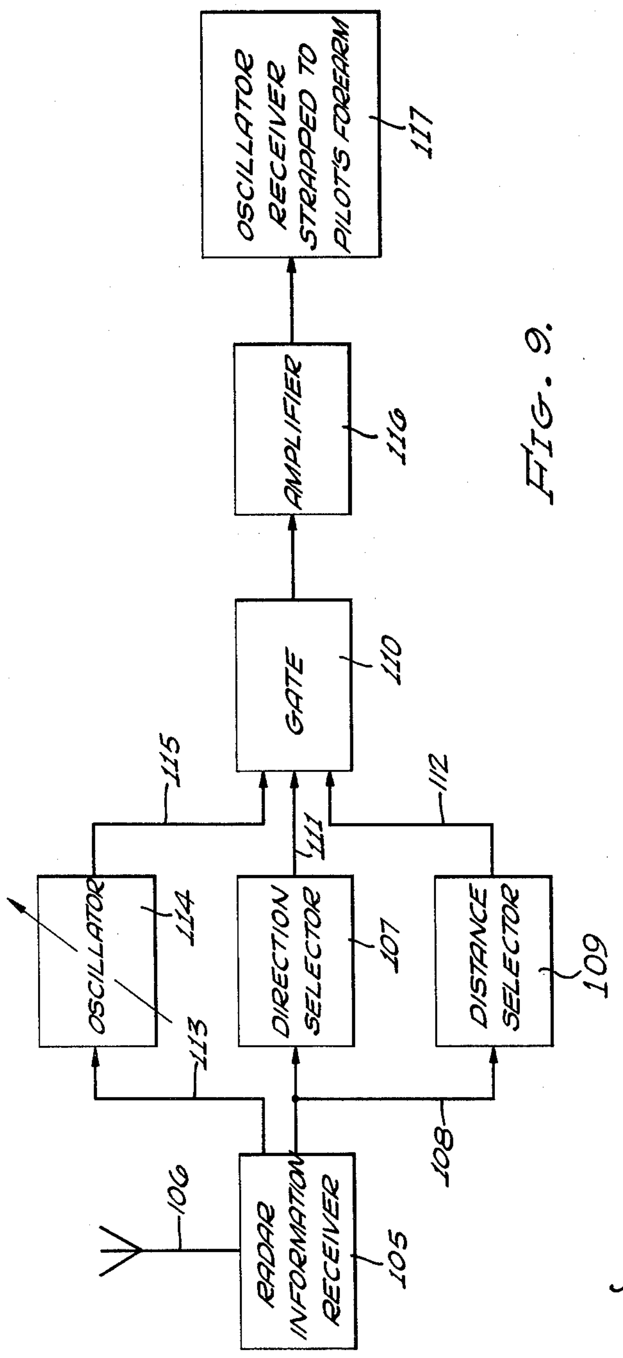
FIGURE 9 is a schematic view of still another embodiment useful in communicating information of the changing distance between a moving craft and some other object.

There remains to be described a third embodiment of the invention useful in sensing the changing distance between a craft in flight and some other craft or fixed object lying in or close to the flight course. The suitable system operable for this purpose and appropriately termed a collision anticipator is illustrated in FIGURE 9 wherein it will be seen to comprise a radar information receiver 105 having a suitable searching antenna system 106 connected therewith. It will be understood that the antenna system may include one or several searching devices as required to search the area to either side and forwardly of the plane including both the direction of other objects with respect to the flight course and the distance thereof from the plane. The signals relating to the direction of the object, whether such object be another aircraft or a stationary object such as a mountain, is channeled into direction selector analyzer 107, whereas the distance signal is channeled through lead 108 into the distance selector analyzer 109.

It will be understood that analyzers 107 and 109 include such connections as may be necessary to operate suitable known computer components for analyzing the signals and determining whether a collision is likely if the craft carrying the equipment continues on its course. If analyzer 107 indicates that the craft is flying on a collision course or close thereto and distance analyzer 109 indicates that the distance vector is decreasing at a rate such that a collision is likely, then the signal outputs from 108 and 109 passing to the triple triode gate 110 through channels 111 and 112, respectively, are jointly effective to open this gate to pass a variable signal emanating from variable oscillator 114.

It will be understood that radar receiver 105 includes means for transmitting a signal over channel 113 to operate any suitable servo-mechanism to vary the frequency output of oscillator 114 within the tactually perceptible range of frequencies mentioned above. Preferably, the servo-mechanism and oscillator 114 are so arranged as to increase the frequency of the output signal in accordance with the proximity of the impending collision, whereby a higher frequency indicates an emergency situation. If the outputs of the direction and distance analyzers taken together indicate a collision course, their combined outputs function to hold gate 110 open so that the frequency output of oscillator 114 flows through channel 115, through gate 110 and into an amplifier 116 if one is necessary to provide a signal of sufficient strength to operate an oscillatory receiver 117. The latter is of any suitable construction and may be strapped to some part of the pilot's body such as to his forearm so that the vibrations imparted to the skin will convey a readily understood imperative warning to the pilot concerning the imminent danger.

Although the several embodiments described above include no switches or other means for deactivating part or all of the system, or for disconnecting the activating signal for the diaphragms when intelligence is not desired, it will be understood that such controls may be added to the end that an activating signal for the stimulators is available when and as desired by the crew human receiver.

When the particular tactile communication systems and methods of operating an aircraft using tactually perceived intelligence are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. An airborne flight condition sensing and communicating system for a vehicle to indicate the characteristics of movement of the vehicle to an observer removed from the vehicle, including, a plurality of condition sensing devices for sensing changes in the attitude of the vehicle during movement of the vehicle and for producing signals in accordance with such sensings, computer means operatively connected with the sensing devices for combining the signals from the sensing devices in a particular relationship to produce signals having characteristics representing the acceleration of the vehicle in particular directions, means operatively coupled to the computer means for converting the signals from the converter means into output signals having frequency characteristics representative of the characteristics of the signals from the computer means, means for transmitting the output signals, a receiver at the position of the observer for receiving such transmitted signals, filter means having a plurality of lines, the filter means being operatively coupled to the receiver to introduce the signals to the different lines in the plurality in accordance with the individual frequencies of the received signals, and separate tactile sensory devices individually coupled to the different lines in the filter means and to the observer at different positions on the observer whereby the observer may be apprised simultaneously and individually of the accelerations of the vehicle in the particular directions.

2. The system defined in claim 1 characterized in the provision of means for each of said sensing devices for providing signals having different characteristics dependent upon the direction of variation in attitude of the vehicle from a preselected norm position, and a pair of closely associated tactile sensory devices for each of said sensing devices at the position of the observer, each of the closely associated tactile sensory devices in each pair being activated by a signal indicative of a change in the attitude of the vehicle in a different direction from the preselected norm position.

3. A communication system for transmitting information relating to the operational conditions of a vehicle to an operator at a position removed from the vehicle, including, a plurality of sensing devices mounted on the vehicle and so disposed that the devices are constructed to sense attitudes of the vehicle relative to a plurality of different axes, computer means coupled to said plurality of sensing devices for analyzing the signals emanating from said devices and for transmitting to the removed position signals of different tactually distinguishable frequency characteristics representing the accelerations or decelerations of the vehicle relative to said different axes and the magnitudes of said accelerations or decelerations, means at the removed position for receiving the transmitted signals, filter means responsive to the received signals and including a plurality of lines for introducing the signals of different frequencies to the individual lines in the plurality, and tactually sensory means mounted in contact with the operator and operatively coupled to the individual lines in the plurality in the filter means for providing tactual indications to the operator of the accelerations of the vehicle relative to the different axes.

4. In combination for developing a tactile indication representing a signal provided from a moving object at a first position ot an operator at a stationary position removed from the first position, including, first means at the moving object for detecting attitudes of the moving object relative to particular axes and for producing signals representing such attitudes, second means at the moving object and responsive to the signals from the first means for developing signals having magnitudes indicative of the accelerations of the moving object relative to the particular axes, third means also at the moving object and coupled to said second means for providing continuous signals having instantaneous frequencies variable in accordance with variations in the instantaneous magnitudes of said signals from said second means whereby indications are provided of the magnitudes of the accelerations of the moving object, fourth means operatively coupled to the third means for transmitting the signals from the third means, fifth means for receiving the signals from the fourth means, sixth means operatively coupled to the fifth means at the stationary position for filtering the received signals and including a plurality of paths for providing for the introduction of the signals to the different paths in accordance with the different frequencies of the filtered signals, and seventh means at the stationary position for receiving the signals passing through the different lines in the plurality in the sixth means and for providing tactile indications to the operator at the stationary position in accordance therewith whereby a sensation is provided to the operator at the stationary position corresponding to the sensation which the operator would receive at the moving object due to changes in the acceleration of the moving object.

5. In combination for providing at a first position tactile communications representing the sensations which an operator in an object at a second position variable in location would receive in accordance with accelerations of the object at the second position, first means in the object at the second position for detecting rectilinear and rotational changes in speed of the second position and for developing electrical signals representing the changes of the rectilinear and rotational speeds of the second position, second means on the object and operatively coupled to the first means for combining the electrical signals from the first means in particular relationships to provide a plurality of output signals having characteristics representing the accelerations on the object at the second position in a particular direction, third means in the object and operatively coupled to the second means for transmitting the output signals, fourth means for receiving the transmitted signals, fifth means at the first position and operatively coupled to the fourth means and including a plurality of individual paths for introducing the received signals to the individual paths in accordance with the characteristics of the received signals, and sixth means at the first position and responsive to the signals in the different paths for providing tactile indications corresponding to the accelerations of the object in the particular direction whereby an operator at the first position effectively has a seat on the moving object from the standpoint of the sensations received in accordance with changes in speed of the moving object.

6. In combination for providing to a ground control operator tactile communications representing the sensations which an individual would receive on an aircraft responsive to changes in the attitude of the aircraft where the aircraft is displaced from the ground control operator, first means on the aircraft at different positions for detecting accelerations of the aircraft at such positions, second means on the aircraft and operatively coupled to the first means and responsive to the electrical signals from the first means for combining such signals in particular relationships to produce signals representing the acceleration of the aircraft in a particular direction, third means on the aircraft and operatively coupled to the second means for converting the signals from the second means into output signals having frequencies related to the magnitude and polarity of the acceleration in the particular direction, fourth means on the aircraft and coupled to the third means for transmitting said electrical signals, fifth means associated with the ground control operator for receiving said transmitted signals, sixth means operatively coupled to the fifth means and including a plurality of lines for introducing the received signals individually to the different lines in accordance with the frequencies of the received signals, and seventh means operatively coupled to the sixth means and to the ground control operator for providing tactile indications to the ground control operator at the different frequencies of the received signals and at different positions in accordance with the frequencies of the received signals whereby the instantaneous frequency of each tactile indication indicates the magnitude of an acceleration and the rate of change of frequency indicates the rate of change of the acceleration.

7. In combination for developing a tactile indication representing a signal provided from a moving position to a stationary position, including, means at the moving position for detecting changes in the speed of the moving position and for developing a signal having a magnitude indicative of the rate of change of the speed of the moving position, means also at the moving position and coupled to said detecting means for providing a continuous signal having an instantaneous frequency determined by the instantaneous magnitude of said signal from said developing means whereby an indication is provided of the magnitude of the acceleration of the position, means at the moving position and coupled to said providing means for transmitting a carrier signal modulated by said continuous signal from said providing means, means at the stationary position for receiving said modulated carrier signal and for recovering said continuous modulating signal, and means at the stationary position and electrically coupled to said receiving means for providing a tactile indication in accordance with the recovered modulating signal whereby a sensation is provided to a human receiver at the stationary position which corresponds to the sensation which an individual at the moving position would receive due to changes in the speed of the moving position.

References Cited in the file of this patent

UNITED STATES PATENTS

| | | |
|---|---|---|
| 1,952,368 | Gardner | Mar. 27, 1934 |
| 2,078,982 | Stark | May 4, 1937 |
| 2,148,471 | Jones | Feb. 28, 1939 |
| 2,150,364 | Dudley | Mar. 14, 1939 |
| 2,193,077 | Saxman | Mar. 12, 1940 |
| 2,282,102 | Tunick | May 5, 1942 |
| 2,410,424 | Brown | Nov. 5, 1946 |
| 2,432,123 | Potter | Dec. 9, 1947 |
| 2,499,349 | Ayres | Mar. 7, 1950 |
| 2,643,369 | Manley | June 23, 1953 |
| 2,657,476 | Holcombe | Nov. 3, 1953 |
| 2,682,042 | Harcum | June 22, 1954 |
| 2,703,344 | Anderson | Mar. 1, 1955 |
| 2,721,316 | Shaw | Oct. 18, 1955 |
| 2,754,505 | Kenyon | July 10, 1956 |
| 2,827,621 | Reichert et al. | Mar. 18, 1958 |
| 2,972,140 | Hirsch | Feb. 14, 1961 |
| 3,040,567 | Brody | June 26, 1962 |

OTHER REFERENCES

Publication—"Tactical Sensory Control System," Electrical Manufacturing, October 1954, pp. 118–121.